(12) United States Patent
Tsuji et al.

(10) Patent No.: US 7,232,964 B2
(45) Date of Patent: Jun. 19, 2007

(54) LOAD TRANSFER MECHANISM

(75) Inventors: Koji Tsuji, Niiza (JP); Mikio Yamashita, Asaka (JP)

(73) Assignee: Tanita Corporation, Tokyo (JP)

( * ) Notice: Subject to any disclaimer, the term of this patent is extended or adjusted under 35 U.S.C. 154(b) by 0 days.

(21) Appl. No.: 11/404,875

(22) Filed: Apr. 17, 2006

(65) Prior Publication Data
US 2006/0231299 A1 Oct. 19, 2006

(30) Foreign Application Priority Data
Apr. 18, 2005 (JP) ............................. 2005-119273

(51) Int. Cl.
*G01G 21/00* (2006.01)
(52) U.S. Cl. ................. 177/238; 177/DIG. 9
(58) Field of Classification Search ............. 177/238, 177/253, 262, DIG. 9
See application file for complete search history.

(56) References Cited

U.S. PATENT DOCUMENTS

| | | | |
|---|---|---|---|
| 186,149 A * | 1/1877 | Montgomery | 177/262 |
| 1,080,398 A * | 12/1913 | Wright | 177/262 |
| 4,456,085 A | 6/1984 | Boyles | |
| 4,819,750 A | 4/1989 | Carnevale | |
| 5,521,334 A * | 5/1996 | Freeman | 177/154 |

FOREIGN PATENT DOCUMENTS

| | | |
|---|---|---|
| JP | 57-046128 A | 3/1982 |
| JP | 58-19236 | 2/1983 |
| JP | 59-68230 | 5/1984 |
| JP | 62-190422 A | 8/1987 |

* cited by examiner

*Primary Examiner*—Randy W. Gibson
(74) *Attorney, Agent, or Firm*—McDermott Will & Emery LLP

(57) ABSTRACT

In a load transfer mechanism which transfers load to a load cell that constitutes a Roberval mechanism, a load transfer member has at least an area right above a load cell mounting section in the top surface thereof as a concave surface area formed to be lower than the remaining area of the top surface thereof so that it does not contact a cover member. Thus, if the barycentric position of the load of an object to be weighed placed on the cover member, regardless of whether the load is concentrated load or divided load, the load transfer mechanism can reduce the difference of the influence of deflection of the load transfer member or moment imposed on the load, transfer given load to the load cell through the load transfer member and decrease a span error produced by the load position of an object to be weighed.

1 Claim, 13 Drawing Sheets

FIG.10

CONVENTIONAL LOAD TRANSFER MECHANISM
(DIVIDED LOADS ON LOAD POINTS Q1 AND Q2)

| LOAD VALUE (kg) | 0 | 50 | 100 | 150 | 200 | 250 | 270 |
|---|---|---|---|---|---|---|---|
| IDEAL COUNT VALUE ① | 0 | 10000 | 20000 | 30000 | 40000 | 50000 | 54000 |
| VALUES MEASURED WITH LOAD APPLIED ② | 0 | 10001 | 20002 | 30003 | 40004 | 50005 | 54004 |
| SPAN REFERENCE COUNT VALUE ③ | 0 | 10001 | 20001 | 30002 | 40003 | 50004 | 54004 |
| ② − ③ | 0 | 0 | 1 | 1 | 1 | 1 | 0 |
| VALUES MEASURED WITH LOAD REMOVED ④ | −2 | 9994 | 19903 | 29995 | 39998 | 50002 | |
| ④ − ③ | −2 | −7 | −8 | −7 | −5 | −2 | |

SPAN COUNT VALUE (54004)

NONLINEARITY ERROR COUNT VALUE (−8)

FIG.11

CONVENTIONAL LOAD TRANSFER MECHANISM
(CONCENTRATED LOAD ON LOAD POINT P)

| LOAD VALUE (kg) | 0 | 50 | 100 | 150 | 200 | 250 | 270 |
|---|---|---|---|---|---|---|---|
| IDEAL COUNT VALUE ① | 0 | 10000 | 20000 | 30000 | 40000 | 50000 | 54000 |
| VALUES MEASURED WITH LOAD APPLIED ② | 0 | 9999 | 19996 | 29994 | 39993 | 49990 | 53989 |
| SPAN REFERENCE COUNT VALUE ③ | 0 | 9998 | 19996 | 29994 | 39992 | 49990 | 53989 |
| ② − ③ | 0 | 1 | 0 | 0 | 1 | 0 | 0 |
| VALUES MEASURED WITH LOAD REMOVED ④ | −2 | 9994 | 19999 | 29988 | 39987 | 49986 | |
| ④ − ③ | −2 | −4 | −7 | −6 | −5 | −4 | |

SPAN COUNT VALUE (53989)

NONLINEARITY ERROR COUNT VALUE (−7)

FIG.12

LOAD TRANSFER MECHANISM OF PRESENT INVENTION
(DIVIDED LOADS ON LOAD POINTS Q1 AND Q2)

| LOAD VALUE (kg) | 0 | 50 | 100 | 150 | 200 | 250 | 270 |
|---|---|---|---|---|---|---|---|
| IDEAL COUNT VALUE ① | 0 | 10000 | 20000 | 30000 | 40000 | 50000 | 54000 |
| VALUES MEASURED WITH LOAD APPLIED ② | 0 | 10003 | 20005 | 30006 | 40006 | 50004 | 54002 |
| SPAN REFERENCE COUNT VALUE ③ | 0 | 10000 | 20001 | 30001 | 40001 | 50002 | 54002 |
| ②−③ | 0 | 3 | 4 | 5 | 5 | 2 | 0 |
| VALUES MEASURED WITH LOAD REMOVED ④ | −3 | 9997 | 19998 | 29999 | 40000 | 50001 | |
| ④−③ | −3 | −3 | −3 | −2 | −1 | −1 | |

54002 → SPAN COUNT VALUE

5 → NONLINEARITY ERROR COUNT VALUE

FIG.13

LOAD TRANSFER MECHANISM OF PRESENT INVENTION
(CONCENTRATED LOAD ON LOAD POINT P)

| LOAD VALUE (kg) | 0 | 50 | 100 | 150 | 200 | 250 | 270 |
|---|---|---|---|---|---|---|---|
| IDEAL COUNT VALUE ① | 0 | 10000 | 20000 | 30000 | 40000 | 50000 | 54000 |
| VALUES MEASURED WITH LOAD APPLIED ② | 0 | 10002 | 20005 | 30005 | 40005 | 50003 | 54001 |
| SPAN REFERENCE COUNT VALUE ③ | 0 | 10000 | 20000 | 30001 | 40001 | 50001 | 54001 |
| ② − ③ | 0 | 2 | 5 | 4 | 4 | 2 | 0 |
| VALUES MEASURED WITH LOAD REMOVED ④ | −2 | 9998 | 19998 | 29999 | 39999 | 50000 | |
| ④ − ③ | −2 | −2 | −2 | −2 | −1 | −1 | |

SPAN COUNT VALUE (54001)

NONLINEARITY ERROR COUNT VALUE (5)

LOAD TRANSFER MECHANISM

BACKGROUND OF THE INVENTION (i) Field of the Invention

This invention relates to a load transfer mechanism to be incorporated in a weighing machine.

(ii) Description of the Related Art

Heretofore, in a weighing machine using a load cell, a number of load transfer mechanisms have been proposed that do not apply load directly to a load cell but apply load through a load transfer member (hereinafter referred to as "frame") which receives load from an object to be weighed and transfers the load to the load cell.

For example, the crossing section of an X-shaped frame is attached to the top surface of a load cell, the ends of the X-shaped frame are positioned near the four corners of a cover member on which an object to be weighed is placed, a load receiving section which receives load applied to the cover member is provided, and the four corners of the cover member are supported by the load receiving sections. Thereby, a mechanism for transferring the load of the object to be weighed from the four corners of the cover member to the load cell through the X-shaped frame is formed (for example, refer to Patent Literature 1 or 2).

Further, a mechanism formed such that an H-shaped frame is attached to a side face of a load cell and a load receiving section which receives load from the four corners of a cover member is provided at each end of the frame as in the above load transfer mechanism is disclosed (for example, refer to Patent Literature 3).

These load transfer mechanisms always receive the load of an object to be weighed which is placed on the cover member by the ends of the frame which support the four corners of the cover member and transfer the load to the load cell along with deflection of the frame. Thus, the mechanisms have an effect of stabilizing load applied to the load cell. Further, when the frame or load receiving section is formed by an elastic material, the load transfer mechanisms have an effect of protecting the load cell by reducing impact when an object to be weighed is dropped on the cover member.

Patent Literature 1

Japanese Utility Model Laid-Open Publication No. 58-19236

Patent Literature 2

Japanese Patent Laid-Open Publication No. 62-190422

Patent Literature 3

Japanese Utility Model Laid-Open Publication No. 59-68230

However, in the conventional load transfer mechanisms, when load is applied to the center of the cover member, the cover member is bent and contacts the frame or load cell, depending on the strength of the cover member, the distance between the cover member and the frame by the load receiving sections or the position of the load of an object to be weighed placed on the cover member (in the example of the prior art of Patent Literature 1 or 2, the cover member contacts the crossing section of the X-shaped frame attached to the load cell, and in the example of Patent Literature 3, the cover member contacts the load cell). That is, some or most of load having been transferred from the four corners of the frame to the load cell is applied from right above the top surface of the load cell, not through the four corners of the frame but directly. That is, load with a moment of nearly zero is applied, and it can be said that influence on the load cell is clearly different from that when load is applied to the load cell only from the four corners of the frame.

This is recognized as a span error as indicated in the results of measurements made by the present inventors that will be described in detail in examples. Further, the above contact does not occur when low load is applied and may occur when load is applied beyond a certain level. Since the influence of moment on the load cell changes abruptly upon occurrence of the above contact, a decrease in nonlinearity accuracy may occur.

To simply avoid this influence, it is conceivable to improve the strength of the cover member so as to prevent deflection of the cover member or to keep a distance at which the cover member and the frame do not contact each other. However, since these lead to an increase in the weight, height or cost of weighing machine, they are not suitable for production of a thin, light and easy-to-use weighing machine.

Thus, an object of the present invention is to solve the above problems and provide a load transfer mechanism capable of transferring given load to a load cell through a frame and reducing a span error.

SUMMARY OF THE INVENTION

To solve the above problems, the present invention provides a load transfer mechanism comprising:

a load cell, a load transfer member, and a cover member, wherein the load cell has both ends as a load point side end and a support point side end and has a deflection detecting section between the ends, the load transfer member has a load cell mounting section to be fixed to the top surface of the load point side end of the load cell, the cover member is supported by the load transfer member and an object to be weighed is placed thereon, load applied to the cover member is transferred to the load cell through the load transfer member, and the load transfer member has at least an area right above the load cell mounting section in the top surface of the load transfer member as a concave surface area formed to be lower than the remaining area of the top surface of the load transfer member so that it does not contact the cover member.

Further, the load transfer member has an external frame which surrounds the load cell mounting section, the load cell mounting section and the exterior frame are connected to each other by a plurality of ribs which are radially disposed, and the concave surface area is an area including the area right above the load cell mounting section and portions of the ribs.

Further, the load transfer member supports the cover member having a placement surface on which an object to be weighed is placed at least at near the four corners out of the top surface of the load transfer member, and the concave surface area is set in accordance with the degree of deflection of the cover member by load.

The load transfer mechanism of the present invention is a load transfer mechanism comprising:

a load cell, a load transfer member, and a cover member, wherein
the load cell has both ends as a load point side end and a support point side end and has a deflection detecting section between the ends,
the load transfer member has a load cell mounting section to be fixed to the top surface of the load point side end of the load cell,
the cover member is supported by the load transfer member and an object to be weighed is placed thereon,
load applied to the cover member is transferred to the load cell through the load transfer member, and
the load transfer member has at least an area right above the load cell mounting section in the top surface of the load transfer member as a concave surface area formed to be lower than the remaining area of the top surface of the load transfer member so that it does not contact the cover member. Thus, if the barycentric position of the load of an object to be weighed placed on the cover member, regardless of whether the load is concentrated load or divided load, the load transfer mechanism can reduce the difference of the influence of deflection of the load transfer member or moment imposed on the load, transfer given load to the load cell through the load transfer member and decrease a span error produced by the load position of an object to be weighed.

Further, the load transfer member has an external frame which surrounds the load cell mounting section, the load cell mounting section and the exterior frame are connected to each other by a plurality of ribs which are radially disposed, and the concave surface area is an area including the area right above the load cell mounting section and portions of the ribs. Thus, the existing load transfer members can be designed, processed and applied easily so as to fit the load transfer mechanism of the present invention.

Further, the load transfer member supports the cover member having a placement surface on which an object to be weighed is placed at least at near the four corners out of the top surface of the load transfer member, and the concave surface area is set in accordance with the degree of deflection of the cover member by load. Thus, the load transfer mechanism of the present invention can conform to a case where the strength of the cover member is low and can reduce the cost of the cover member.

BRIEF DESCRIPTION OF THE DRAWINGS

FIG. 10 shows representative measured data when concentrated load was applied to the load point P using a conventional load transfer mechanism.
FIG. 11 shows representative measured data when a half load was applied to the load points Q1 and Q2 using the conventional load transfer mechanism.
FIG. 12 shows representative measured data when concentrated load was applied to the load point P using the load transfer mechanism of the present invention.
FIG. 13 shows representative measured data when a half load was applied to the load points Q1 and Q2 using the load transfer mechanism of the present invention.

DETAILED DESCRIPTION OF THE PREFERRED EMBODIMENTS

The load transfer mechanism of the present invention comprises:
a load cell,
a load transfer member, and
a cover member, wherein
the load cell has both ends as a load point side end and a support point side end and has a deflection detecting section between the ends,
the load transfer member has a load cell mounting section to be fixed to the top surface of the load point side end of the load cell,
the cover member is supported by the load transfer member and an object to be weighed is placed thereon,
load applied to the cover member is transferred to the load cell through the load transfer member, and
the load transfer member has at least an area right above the load cell mounting section in the top surface of the load transfer member as a concave surface area formed to be lower than the remaining area of the top surface of the load transfer member so that it does not contact the cover member.

Further, the load transfer member has an external frame which surrounds the load cell mounting section, the load cell mounting section and the exterior frame are connected to each other by a plurality of ribs which are radially disposed, and the concave surface area is an area including the area right above the load cell mounting section and portions of the ribs.

Further, the load transfer member supports the cover member having a placement surface on which an object to be weighed is placed at least at near the four corners out of the top surface of the load transfer member, and the concave surface area is set in accordance with the degree of deflection of the cover member by load.

EXAMPLES

Figure 1:
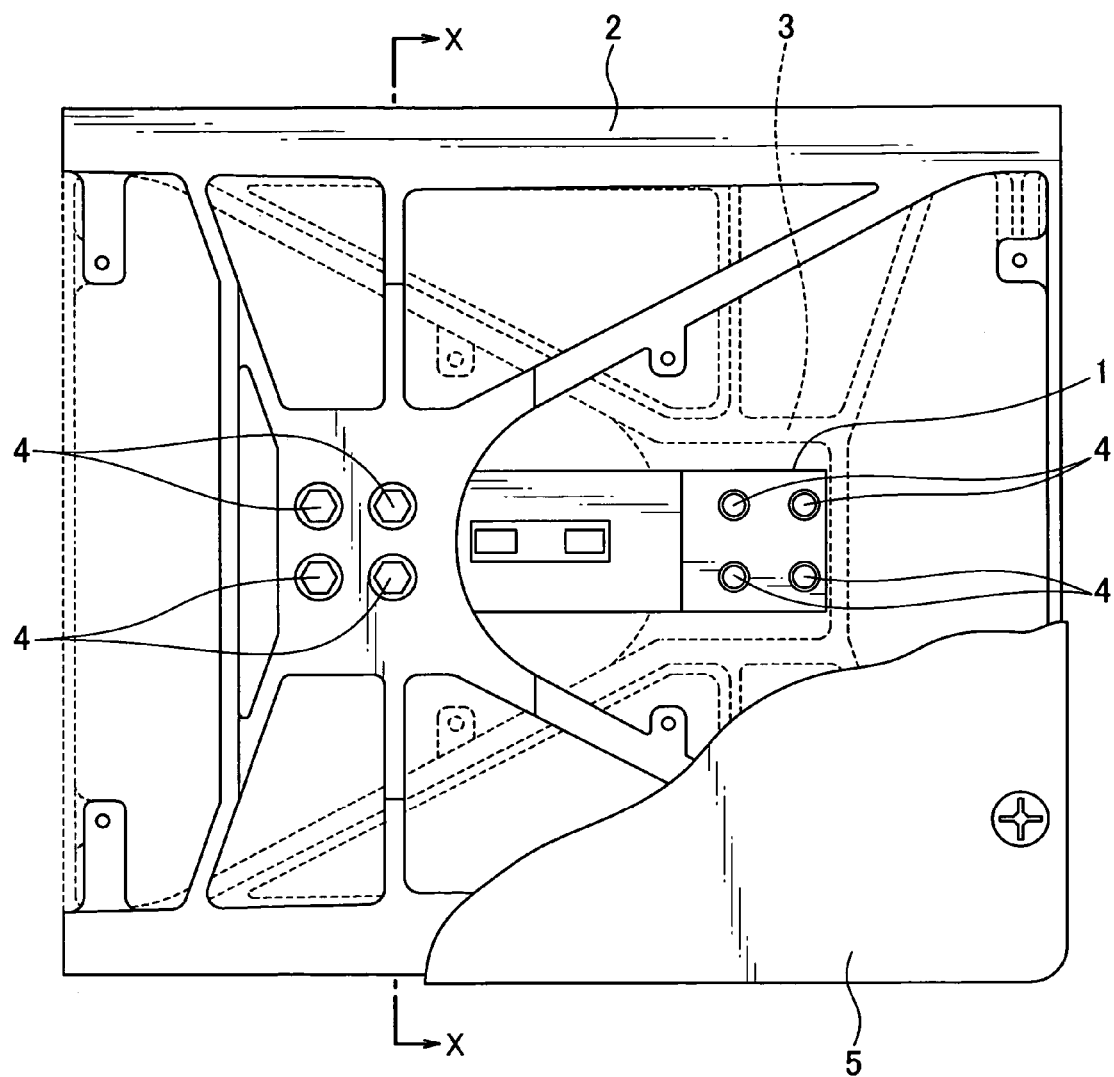
FIG. 1 is a front view of a load transfer mechanism of the present example.
Figure 2:
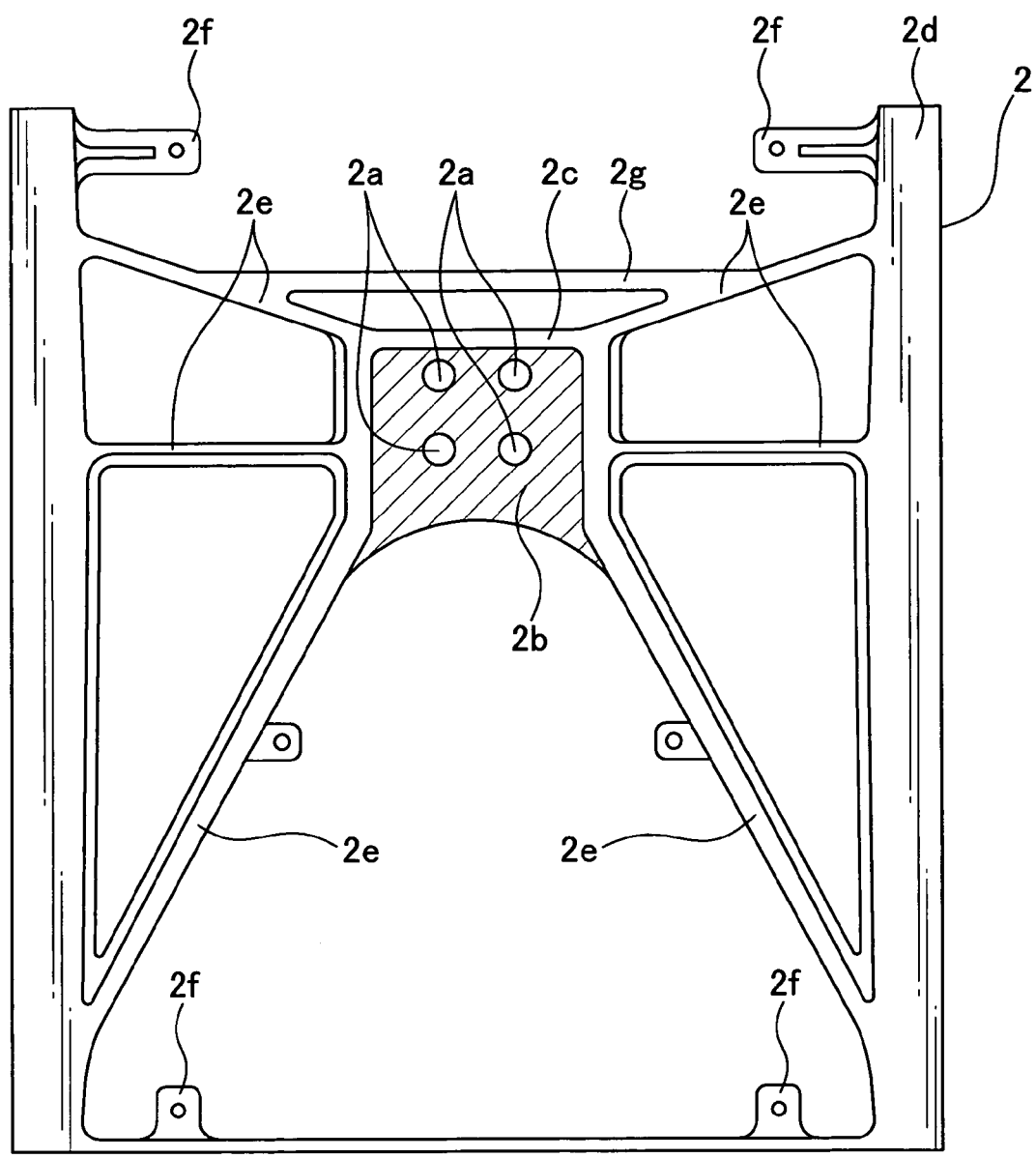
FIG. 2 is a front view of a frame viewed from the load cell attached side.
Figure 3:
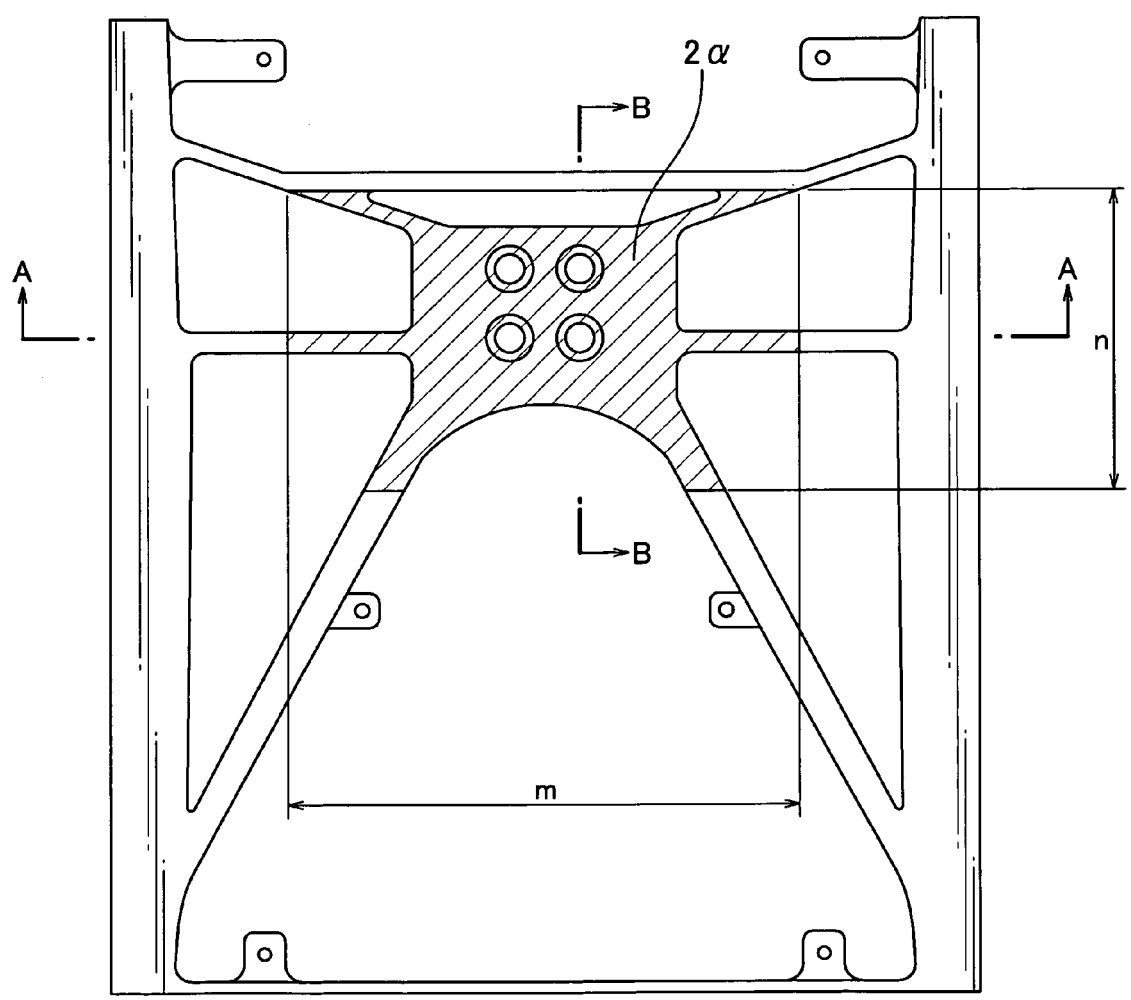
FIG. 3 is a back side view of FIG. 2.
Figure 4:
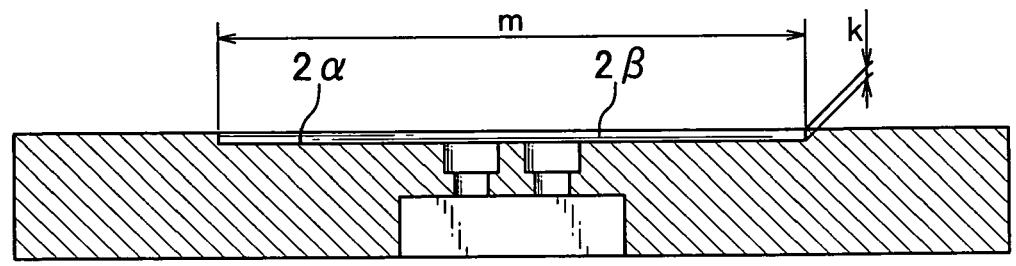
FIG. 4 is a cross-sectional view at A-A of FIG. 3.
Figure 5:
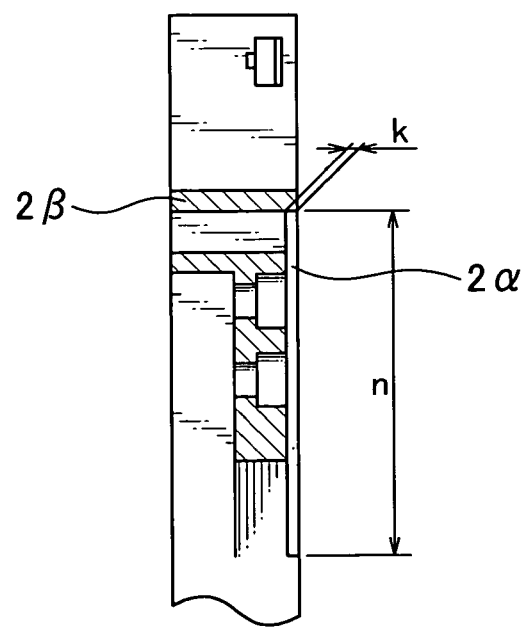
FIG. 5 is a cross-sectional view at B-B of FIG. 3.

The constitution of load transfer mechanism according to an example of the present invention will be described by use of FIGS. 1 to 5. FIG. 1 is a front view of the load transfer mechanism in a weighing machine. FIG. 2 is a front view of a frame viewed from the load cell attached side. FIG. 3 is a back side view of FIG. 2. FIG. 4 is a cross-sectional view at A-A of FIG. 3. FIG. 5 is a cross-sectional view at B-B of FIG. 3.

First, as shown in FIG. 1, the load transfer mechanism according to the present example is constituted by a load cell 1 which constitutes a known Roberval mechanism, a load point side frame 2 and a support point side frame 3 which are load transfer means for transferring load to the load cell, and screws 4 for securing the frames 2 and 3 at predetermined positions on the load cell. In FIG. 1, the support point side frame 3 is shown in a dotted line. Further, a cover 5 which serves as a platform on which an object to be weighed is placed is fixed to the top surface of the load point side frame 2 by screws.

A description of the load cell will be omitted because it is known.

Further, as shown in FIG. 2 which is a front view of the load point side frame 2 viewed from the load cell 1 attached side, the load point side frame 2 has, near its center, a load cell mounting area 2b (blackened by diagonal lines in FIG. 2) including holes 2a through which the screws 4 are passed and also comprises a rib 2c, an exterior frame 2d, a number of connecting ribs 2e, a reinforcing rib 2g, and fixing parts 2f. The rib 2c surrounds the load cell mounting area 2b in the form of a horseshoe. The rib 2c and the exterior frame 2d are connected to each other by the connecting ribs 2e. The reinforcing rib g connects the connecting ribs 2e to the load cell mounting area 2b. Further, the fixing parts 2f fix the cover 5 to near the four corners of the load point side frame 2.

Further, as shown in FIG. 3 which is a back side view of FIG. 2, i.e., a view of the load point side frame 2 viewed from the cover 5 attached side, a surface portion blackened by diagonal lines in FIG. 3 forms an area including the load cell mounting area 2b, the horseshoe-shaped rib 2c and portions of the connecting ribs 2e in the vicinity of the rib 2c, i.e., an area indicated by a size of m×n in FIG. 3, in a concave shape on the load cell 1 mounting side as a concave surface area $2\alpha$, which concave surface area being formed as a one-stage (slightly) lower area than the remaining area of the top surface of the frame 2. The sizes of m and n are set in accordance with the degree of deflection of the cover 5. When the degree of deflection of the cover 5 is high, the sizes of m and n are set to be small so as to narrow the concave surface area $2\alpha$, while when the degree of deflection is low, the sizes of m and n are set to be large so as to widen the concave surface area $2\alpha$.

Further, as shown in the cross-sectional view at A-A of FIG. 4 and the cross-sectional view at B-B of FIG. 5, the above concave surface area $2\alpha$ has a depth of k, and the remaining area on the cover 5 attached side of the load point side frame 2 is formed on the same plane. In the cross-sectional views of FIGS. 4 and 5, the screws 4 are not shown. In subsequent cross-sectional views, the screws are also not shown.

Further, the support point side frame 3 is formed in the same form as that of the load point side frame 2. Although not shown, the support point side frame 3 comprises holes 3a, a load cell mounting area 3b, a rib 3c, an exterior frame 3d, connecting ribs 3e, fixing parts 3f for fixing the base member of the weighing machine, and a reinforcing rib 3g.

Figure 6:
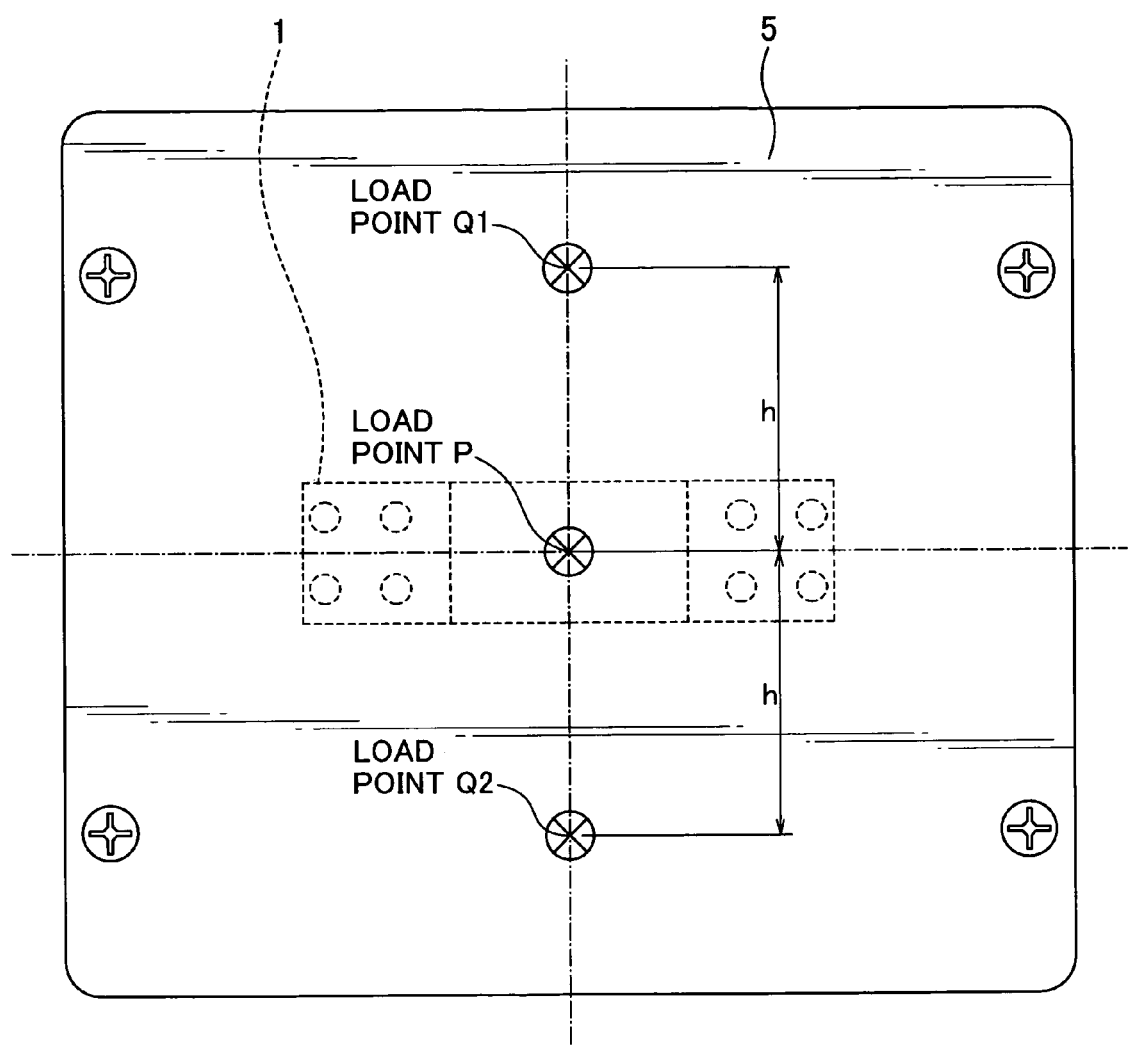
FIG. 6 is a diagram showing load positions on a cover.
Figure 7:
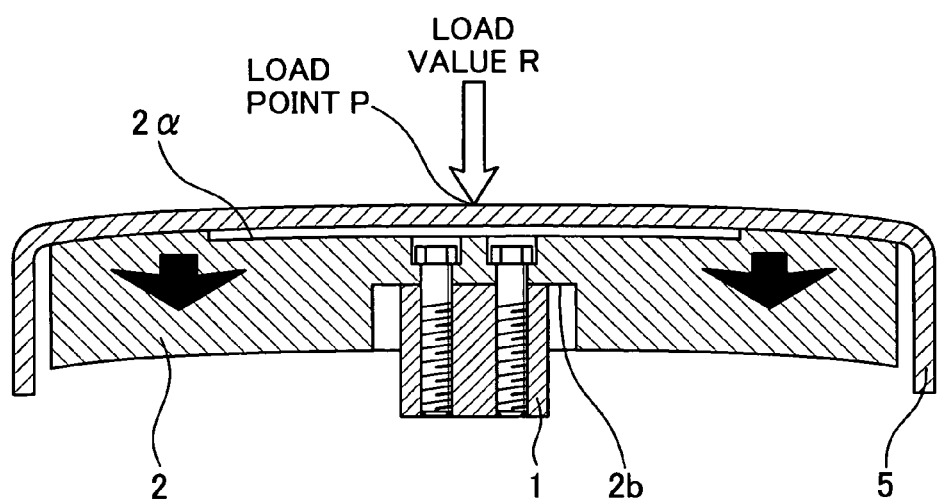
FIG. 7 is a cross-sectional view at X-X with concentrated load R applied to the load point P of FIG. 6.
Figure 8:
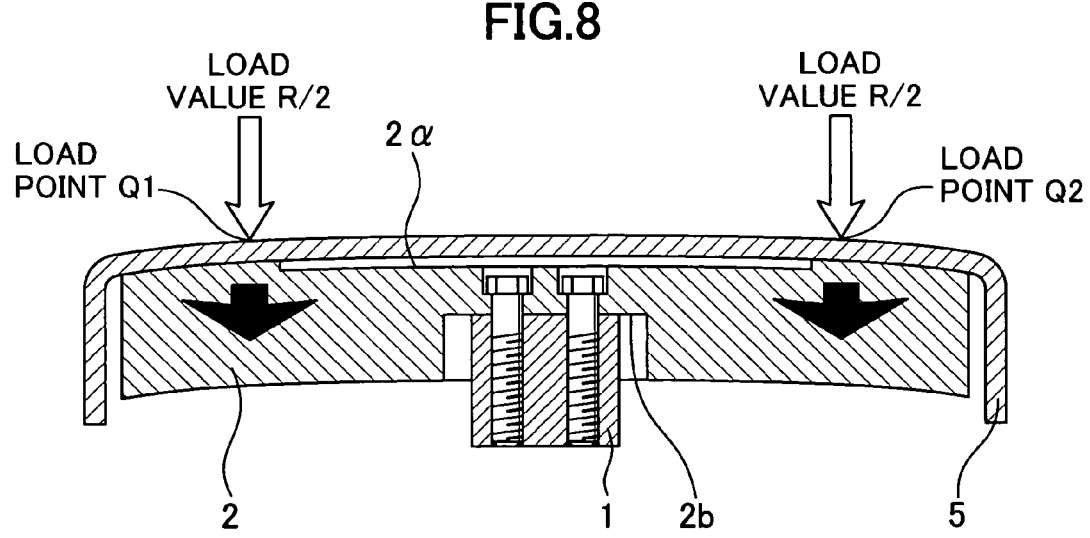
FIG. 8 is a cross-sectional view at X-X with a half load R/2 applied to the load points Q1 and Q2 of FIG. 6.

Next, deformation of the load transfer mechanism at load positions on the cover 5 will be described by use of FIGS. 6 to 8. FIG. 6 is a diagram showing load positions on the cover. The center of the load cell 1 indicated in a dotted line is a load point P, and positions apart from the load point P by a distance h as shown in FIG. 6 are a load point Q1 and a load point Q2. Further, FIG. 7 is a cross-sectional view at X-X of FIG. 1 with concentrated load R applied to the load point P. FIG. 8 is a cross-sectional view at X-X of FIG. 1 with a half R/2 of the concentrated load R applied to the load points Q1 and Q2 so that the barycentric position of the load is situated at the center of the load cell 1. FIGS. 7 and 8 do not show the support point side frame 3.

It is understood from FIG. 7 that since the cover member 5 does not contact the concave surface area $2\alpha$, the load R is not applied directly to the load cell mounting area 2b but is transferred from the load point side frame 2 which contacts the cover 5 as indicated by black arrows in FIG. 7, that is, the load is transferred to the load cell 1 along with deflection of portions of the exterior frame 2d and the connecting ribs 2e.

Even when the load is halved and applied as shown in FIG. 8, the load is transferred to the load cell 1 along with deflection of portions of the exterior frame 2d and connecting ribs 2e of the load point side frame 2 as indicated by black arrows in FIG. 8, as in the above FIG. 7. Thus, the difference of the influence of moment imposed on the load cell mounting area 2b according to the load positions becomes small, and nearly constant load can be constantly transferred from the load cell mounting area.

Figure 9:
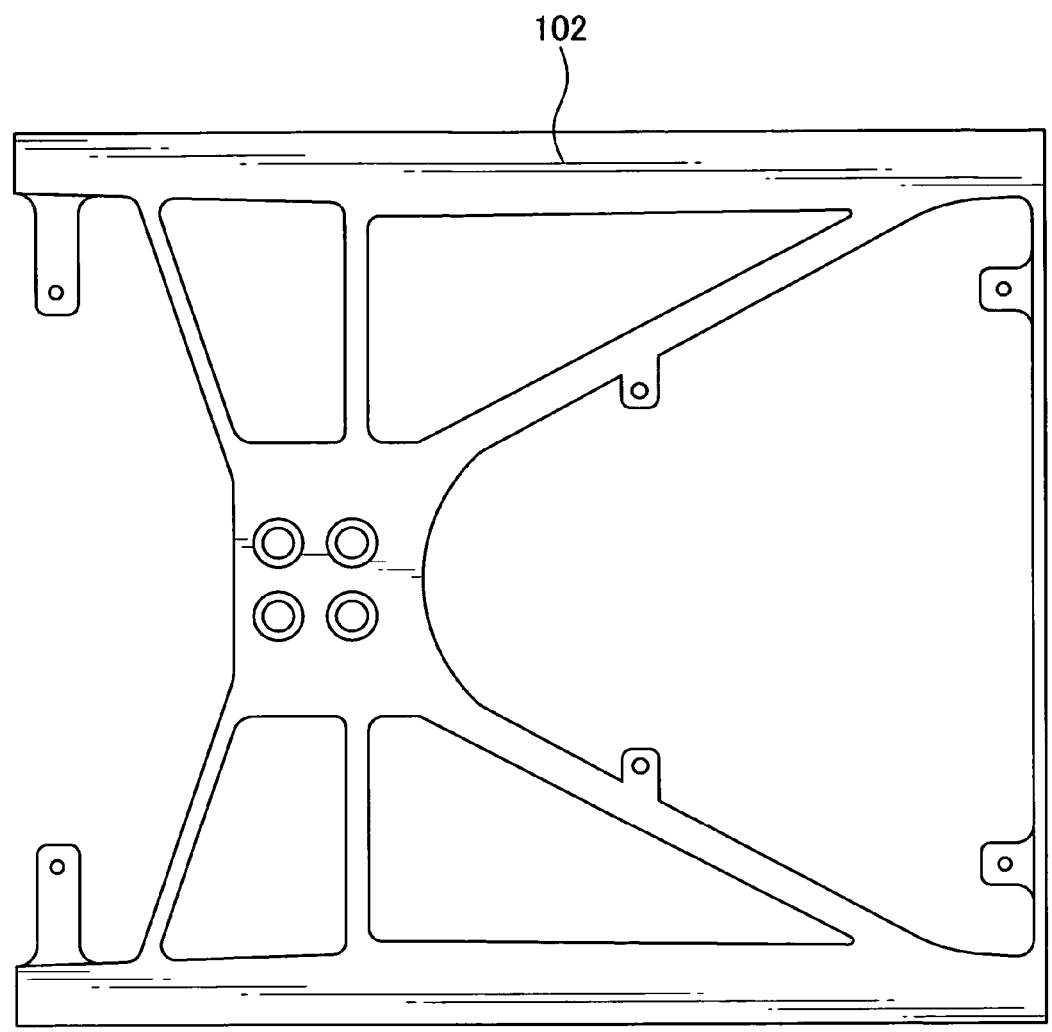
FIG. 9 is a diagram showing the shape of a conventional frame.

Hereinafter, comparison of accuracy by measurements between a conventional load transfer mechanism and the load transfer mechanism of the present invention will be described. FIG. 9 shows the shape of a conventional load point side frame. The results of comparison of measured data are shown by use of FIGS. 10 to 13.

Unlike the above load point side frame 2 of the present example shown in FIGS. 2 to 5, a conventional load point side frame 102 shown in FIG. 9 does not comprise the concave surface area $2\alpha$ and the reinforcing rib 2g. The cover 5 attached side of the load point side frame 102 is formed on the same plane. The remaining constitution is the same as that of the above load point side frame 2. The following measurements were made by use of a load transfer mechanism using the conventional load point side frame 102 and a support point side frame 103 which is formed in the same manner as the load point side frame 102 in place of the above load point side frame 2 and support point side frame 3 shown in FIG. 1.

The results of comparison of the accuracies of the measurements made by use of the conventional load transfer mechanism and the above load transfer mechanism of the present invention are shown by use of FIGS. 10 to 13. In these measurements, the maximum weight was 270 kg, and data was acquired through a circuit that output strain amounts when load which was increased stepwise by 50 kg to 250 kg was imposed and removed as count values. As shown in the above FIGS. 6 to 8, concentrated load on the load point P and divided loads on the load points Q1 and Q2 were compared. As for the above count value, 1 count is output for 5 g.

FIG. 10 is a diagram showing representative measured data when concentrated load was applied to the load point P in the conventional load transfer mechanism. FIG. 11 shows data when divided loads were applied to the load points Q1 and Q2 in the conventional load transfer mechanism. Further, FIGS. 12 and 13 show data by the above concentrated load and divided loads in the load transfer mechanism of the present invention.

In these results, attention is paid to a difference in span between when the concentrated load was applied and when the divided loads were applied. In the conventional load transfer mechanism shown in FIGS. 10 and 11, count values when the maximum weight was applied are 54004 (count) and 53989 (count), and the difference is 15 (count) which corresponds to 75 (g) in terms of load value.

Meanwhile, the corresponding count values in the load transfer mechanism of the present invention shown in FIGS. 12 and 13 are 54002 (count) and 54001 (count), and the difference is only 1 (count), indicating that it can be reduced to about 5 (g) in terms of load value.

Further, the strength against deflection of the frame 2 itself is enhanced by the influence of the above reinforcing rib 2g provided to form the concave surface area 2α. Thus, it is understood that when nonlinearities were compared, the nonlinearity in the load transfer mechanism of the present invention was reduced to about 5 (count), indicating possibility of an improvement in accuracy, while the nonlinearity in the conventional load transfer mechanism was 7 or 8 (count) for a maximum weight of 54000 (count).

In the present example, the load transfer mechanism constituted such that the load point side frame 2 and the cover 5 contact each other at portions other than the above concave surface area 2α when no load is applied has been described as an example. However, it can be said that the same effect as that in the present example can also be attained with a load transfer mechanism constituted such that the load point side frame 2 supports only near the four corners of the cover 5 when no load is applied, as shown in the conventional example.

Figure 14:
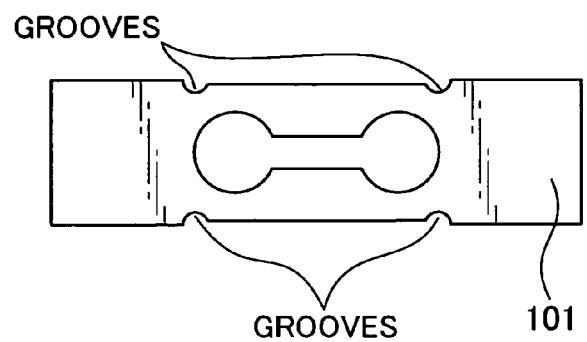
FIG. 14 is a diagram showing an example of the existing load cells.
Figure 15:
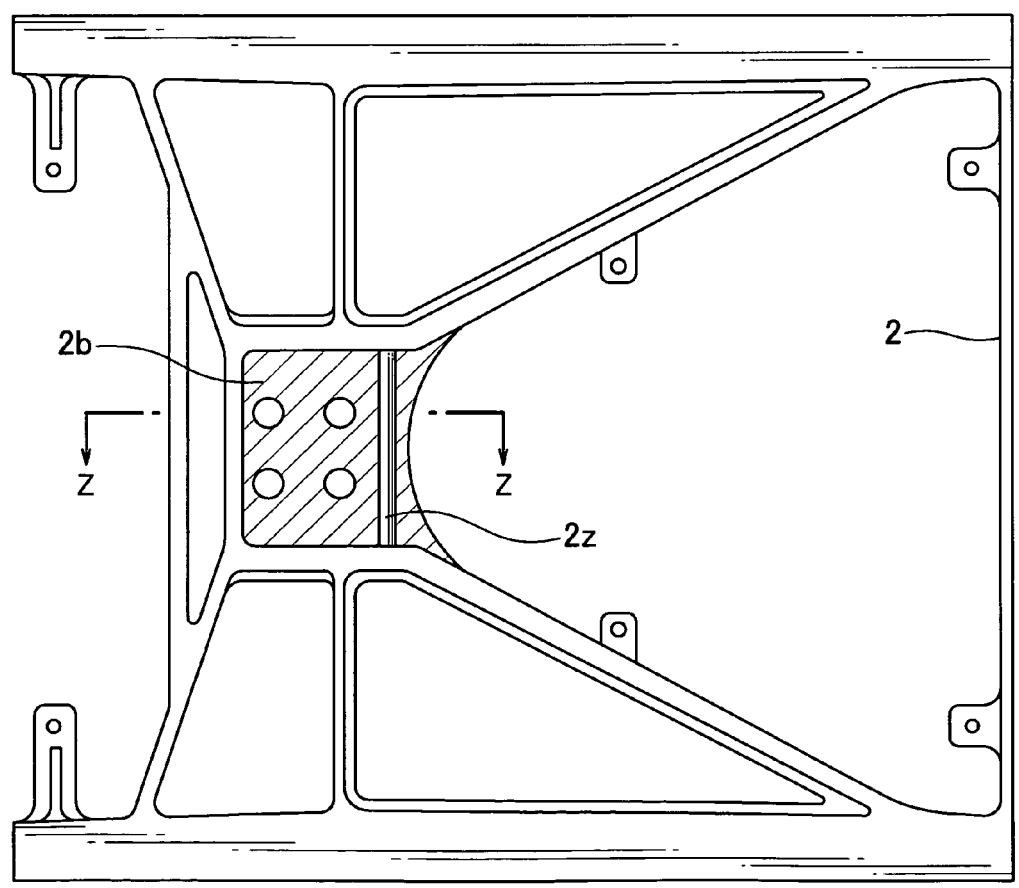
FIG. 15 is a front view of an example of another form of the frame of the present invention.
Figure 16:
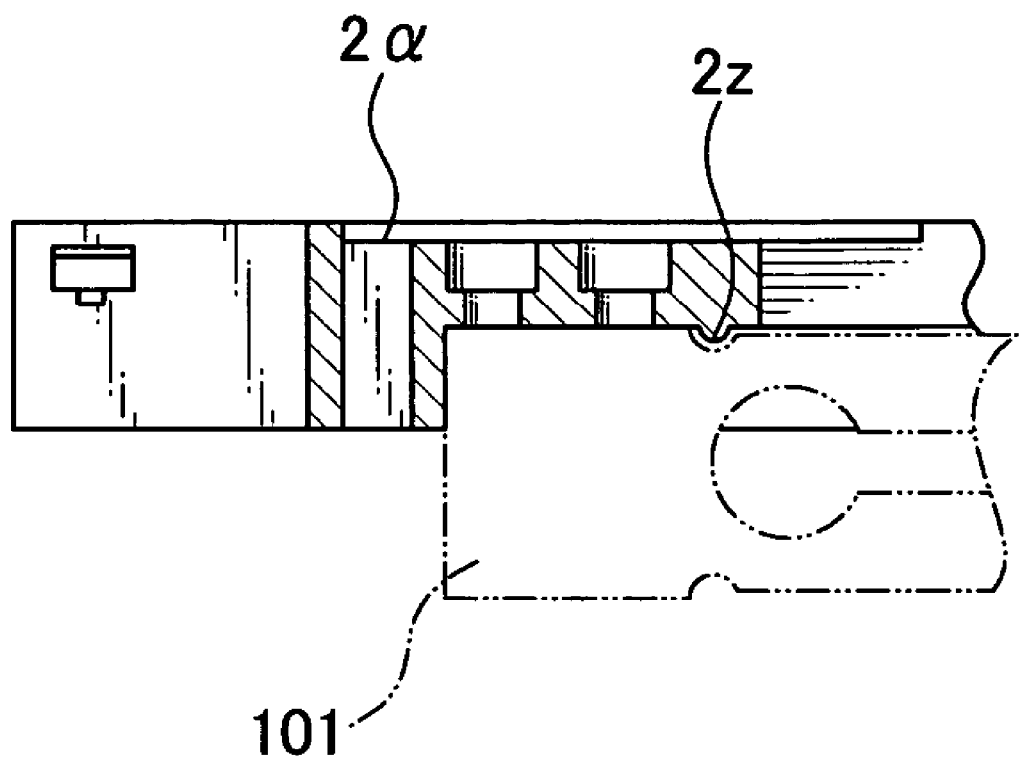
FIG. 16 is a cross-sectional view at Z-Z of FIG. 14.

Further, although the load cell has not been described in detail in the present example because it is known, it is possible that an additional rib to inhibit deflection of the frame itself is added to the load cell mounting area 2b of the load point side frame 2 so as to transfer stable load to the load cell more effectively. For example, as shown in FIG. 14, in the case of a load cell 101 which has large grooves formed in the vicinity of the mounting position of the load point side frame 2, an auxiliary rib 2z which does not contact the above grooves when load is applied may be provided, as shown in the frame front view of FIG. 15 and the cross-sectional view at Z-Z of FIG. 16.

What is claimed is:

1. A load transfer mechanism comprising:
   a load cell,
   a load transfer member, and
   a cover member,
   wherein
   the load cell has a load point side end and a support point side end and has a deflection detecting section between the load point side end and the support point side end,
   the load transfer member has a load cell mounting section to be fixed to the top surface of the load point side end of the load cell,
   the cover member is supported by the load transfer member and an object to be weighed is placed thereon,
   load applied to the cover member is transferred to the load cell through the load transfer member, and
   the load transfer member has
      an external frame and a horseshoe-shaped rib surrounding the load cell mounting section;
      a plurality of connecting ribs radially extending from the rib, connecting the rib and the external frame to each other;
      a reinforcing rib connecting the plurality of connecting ribs to each other; and
      a concave surface area, a part of which includes an area above the load cell mounting section and portions of the plurality of connecting ribs, the part having dimensions m×n and having a concave shape so that at least the area above the load cell mounting section in the top surface of the load transfer member does not contact the cover member;
   wherein m and n are sized responsive to a degree of deflection of the cover member by a load, such that when the degree of deflection of the cover member is high, the sizes of m and n are small, to narrow the concave surface area, and when the degree of deflection is low, the sizes of m and n are large, to widen the concave surface area.

\* \* \* \* \*